US012586731B2

(12) United States Patent
Yamazaki et al.

(10) Patent No.: US 12,586,731 B2
(45) Date of Patent: Mar. 24, 2026

(54) AMORPHOUS DIELECTRIC, CAPACITOR ELEMENT, AND ELECTRONIC DEVICE

(71) Applicant: TDK CORPORATION, Tokyo (JP)

(72) Inventors: Kumiko Yamazaki, Tokyo (JP); Shuto Kano, Tokyo (JP); Yuji Umeda, Tokyo (JP); Hiroki Kitamura, Tokyo (JP); Takeshi Shibahara, Tokyo (JP); Junichi Yamazaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/858,566

(22) Filed: Jul. 6, 2022

(65) Prior Publication Data

US 2023/0027057 A1      Jan. 26, 2023

(30) Foreign Application Priority Data

Jul. 9, 2021    (JP) ................................. 2021-114538
Jun. 20, 2022   (JP) ................................. 2022-099000

(51) Int. Cl.
| | |
|---|---|
| *H01G 4/33* | (2006.01) |
| *C04B 35/462* | (2006.01) |
| *C04B 35/58* | (2006.01) |
| *H01G 4/20* | (2006.01) |

(52) U.S. Cl.
CPC ............. *H01G 4/33* (2013.01); *C04B 35/462* (2013.01); *C04B 35/58* (2013.01); *H01G 4/20* (2013.01); *C04B 2235/768* (2013.01)

(58) Field of Classification Search
CPC .............................. C04B 35/462; C04B 35/58
See application file for complete search history.

(56) References Cited

U.S. PATENT DOCUMENTS

| | | | | |
|---|---|---|---|---|
| 4,734,390 A | * | 3/1988 | Marchand | ................ H01B 3/12 361/321.5 |
| 10,210,921 B1 | * | 2/2019 | Hwang | ............... G11C 11/2273 |
| 2018/0282228 A1 | * | 10/2018 | Shibahara | ......... C04B 35/62218 |

FOREIGN PATENT DOCUMENTS

JP          4981283 B2 *   7/2012   ....... H01L 29/78693

OTHER PUBLICATIONS

JP4981283B2 machine translation (Year: 2012).*

* cited by examiner

*Primary Examiner* — Cameron K Miller
(74) *Attorney, Agent, or Firm* — Oliff PLC

(57) ABSTRACT

An amorphous dielectric includes a compound represented by $A_{1+\alpha}BO_xN_y$. $-0.3 \leq \alpha \leq 0.3$, $0 < x \leq 3.50$, $0 \leq y \leq 1.00$, and $6.70 \leq 2x+3y \leq 7.30$ are satisfied. A sum of an average valence of A-site ions and an average valence of B-site ions is 6.70 to 7.30.

15 Claims, 6 Drawing Sheets

1

AMORPHOUS DIELECTRIC, CAPACITOR ELEMENT, AND ELECTRONIC DEVICE

TECHNICAL FIELD

The present invention relates to an amorphous dielectric, a capacitor element, and an electronic device.

BACKGROUND

Along with improving performance of digital equipment, capacitor elements are demanded to have further larger capacitance. A thinner dielectric enables the capacitor elements to have larger capacitance.

Unfortunately, when a dielectric includes crystals, thinning the dielectric readily reduces electrical resistance. Furthermore, as described in Patent Document 1, when a dielectric is an amorphous dielectric, relative permittivity is lower than that of a dielectric including crystals.

Patent Document 1: JP4981283 (B2)

SUMMARY

The present invention has been achieved under such circumstances. It is an object of the invention to provide an amorphous dielectric with a high relative permittivity even when having a thickness of about 400 nm or less.

An amorphous dielectric according to the first aspect of the present invention comprises a compound represented by $A_{1+\alpha}BO_xN_y$, wherein $-0.3 \leq \alpha \leq 0.3$, $0 < x \leq 3.50$, $0 \leq y \leq 1.00$, and $6.70 \leq 2x+3y \leq 7.30$ are satisfied; and the sum of the average valence of A-site ions and the average valence of B-site ions is 6.70 to 7.30.

An amorphous dielectric according to the second aspect of the present invention comprises an order-disorder ferroelectric including an ordered domain with a length of 10 nm or less.

An amorphous dielectric according to the third aspect of the present invention comprises an order-disorder ferroelectric including an ordered domain with a length of 2 nm or less.

An amorphous dielectric according to the fourth aspect of the present invention comprises an X-ray diffraction pattern including one or more and two or less broad peaks detected in a diffraction angle $2\theta$ range of $10° \leq 2\theta \leq 60°$ with CuKα as the primary source of radiation; and a Raman spectroscopy pattern including one or more and three or less peaks detected in a Raman shift range of $500 \text{ cm}^{-1}$ or more and $1000 \text{ cm}^{-1}$ or less.

An amorphous dielectric according to the fifth aspect of the present invention comprises a hollow X-ray diffraction pattern in an X-ray diffraction image captured with a transmission electron microscope; and a Raman spectroscopy pattern including one or more and three or less peaks detected in a Raman shift range of $500 \text{ cm}^{-1}$ or more and $1000 \text{ cm}^{-1}$ or less.

The amorphous dielectric according to any of the second to the fifth aspects of the present invention may comprise a compound represented by $A_{1+\alpha}BO_xN_y$;

may satisfy $-0.3 \leq \alpha \leq 0.3$, $0 < x \leq 3.50$, $0 \leq y \leq 1.00$, and $6.70 \leq 2x+3y \leq 7.30$; and may have a sum of the average valence of A-site ions and the average valence of B-site ions of 6.70 to 7.30.

A capacitor element according to the present invention comprises any of the above-mentioned amorphous dielectrics.

An electronic device according to the present invention comprises any of the above-mentioned amorphous dielectrics.

BRIEF DESCRIPTION OF THE DRAWING(S)

DETAILED DESCRIPTION

Hereinafter, the present invention is explained based on the embodiment shown in the figures.

Figure 1:
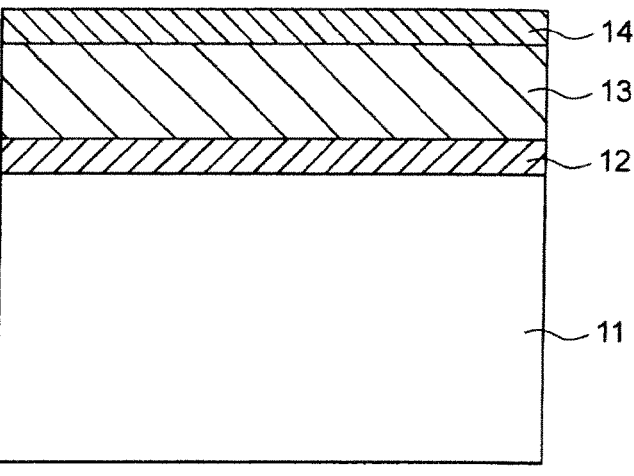
FIG. 1 is a schematic diagram of a thin film capacitor according to an embodiment of the present invention.

FIG. 1 is a schematic view of a thin film capacitor 1, which is an electronic device including a dielectric according to the present embodiment. The thin film capacitor 1 shown in FIG. 1 includes a lower electrode 12 and a dielectric thin film 13 formed in this order on a substrate 11, and an upper electrode 14 formed on a surface of the dielectric thin film 13.

A thin film according to the present embodiment refers to the one formed again after a raw material compound used for manufacture of the thin film is once separated or excited to an atomic level or a molecular level. Thus, a filmy compound formed by application of a slurry or the like is not included in the definition of the thin film according to the present embodiment.

The material of the substrate 11 is not limited. Using a Si single crystal substrate as the substrate 11 is advantageous in terms of availability and costs.

The materials of the lower electrode 12 and the upper electrode 14 are not limited as long as they function as the electrodes. For example, Pt, Ag, and Ni may be mentioned. The lower electrode 12 has a thickness of preferably 0.01 to 10 μm. The upper electrode 14 has a thickness of preferably 0.01 to 10 μm.

Even when the dielectric thin film 13 is thin, namely when the dielectric thin film 13 has a thickness of roughly 400 nm or less or roughly 200 nm or less, the dielectric thin film 13 has a high relative permittivity. This indicates that the dielectric constituting the dielectric thin film 13 of the present embodiment is an amorphous dielectric. The dielectric thin film 13 does not have a lower limit of its thickness. For example, the lower limit is roughly 10 nm.

If the dielectric thin film 13 includes a dielectric having a high crystallinity and large crystals, the relative permittivity of the dielectric thin film 13 decreases as the dielectric thin film 13 thins. This is because, as the dielectric thin film 13 thins, leakage readily occurs between the crystals and the electrical resistance decreases.

When the dielectric thin film 13 includes a dielectric with a low crystallinity, namely when the dielectric constituting the dielectric thin film 13 is an amorphous dielectric, leakage does not occur readily even if the dielectric thin film 13 is thin. However, when the dielectric is an amorphous dielectric, the crystallites in the dielectric have a very small size (several nm or less). In the case of a dielectric including barium titanate ($BaTiO_3$), which is currently used widely, the size limit of the crystallites capable of exhibiting ferroelectricity is about 50 nm. When the crystallites have a size smaller than 50 nm, the crystallites are less likely to exhibit ferroelectricity, and the dielectric has a remarkably low relative permittivity.

The amorphous dielectric constituting the dielectric thin film 13 according to the present embodiment has a specific composition and/or structure, thus having a high relative permittivity even when the thickness of the dielectric thin film 13 is reduced.

Hereinafter, the specific composition and structure of the amorphous dielectric according to the present embodiment is explained.

The amorphous dielectric constituting the dielectric thin film 13 exhibits ferroelectricity. Generally, dielectrics exhibit ferroelectricity through a displacive or an order-disorder mechanism. Dielectrics exhibiting ferroelectricity through the displacive mechanism are called displacive ferroelectrics, and dielectrics exhibiting ferroelectricity through the order-disorder mechanism are called order-disorder ferroelectrics.

Generally known ferroelectrics are mostly the displacive ferroelectrics. In the displacive ferroelectrics, cations and/or anions are displaced to generate bias of electric charge, and thus ferroelectricity is exhibited. Typical displacive ferroelectrics include barium titanate ($BaTiO_3$). In barium titanate, Ti is displaced to generate bias of electric charge, and thus ferroelectricity is exhibited.

In the order-disorder ferroelectrics, cations and/or anions are arranged in ordered arrays (systematic arrays) to exhibit ferroelectricity. Typical order-disorder ferroelectrics include Rochelle salt ($KNaC_4H_4O_6 \cdot 4H_2O$) and potassium dihydrogen phosphate ($KH_2PO_4$). In Rochelle salt and potassium dihydrogen phosphate, H is arranged in ordered arrays, and thus ferroelectricity is exhibited.

The order-disorder ferroelectrics include specific amorphous dielectrics containing oxides and oxynitrides. Specifically, the order-disorder ferroelectrics include an amorphous dielectric containing a compound represented by $A_{1+\alpha}BO_xN_y$ ("A" indicates A-site ions, and "B" indicates B-site ions). The compound may have a perovskite structure. When the compound is an oxide, y=0 is satisfied. When the compound is an oxynitride, y>0 is satisfied. Specifically, the compound represented by $A_{1+\alpha}BO_xN_y$ may have a composition satisfying $-0.3 \leq \alpha \leq 0.3$, $0 < x \leq 3.50$, $0 \leq y \leq 1.00$, and $6.70 \leq 2x+3y \leq 7.30$ and a sum of the average valence of the A-site ions and the average valence of the B-site ions of 6.70 to 7.30. The compound may satisfy $-0.03 \leq \alpha \leq 0.03$.

The average valence refers to an averaged value of valences of ions present in the A-site and B-site based on their abundance ratio. For example, here is a case where Sr and La are present in the A-site at a ratio of 4:1, and Ta and Ti are present in the B-site at a ratio of 4:1. Sr ions have a valence of 2, and La ions have a valence of 3. Thus, on the premise that $X_A$ denotes the average valence of Sr and La, $X_A$ is calculated using Formula 1 shown below. Likewise, Ta ions have a valence of 5, and Ti ions have a valence of 4. Thus, on the premise that $X_B$ denotes the average valence of Ta and Ti, $X_B$ is calculated using Formula 2 shown below. Calculation gives a solution of $X_A$=2.2 and $X_B$=4.8. The sum ($X_A+X_B$) of the average valences is 7.

4

$$X_A = \text{(valence of Sr ions)} \times \text{(abundance ratio of Sr ions)} + \quad \text{Formula 1}$$
$$\text{(valence of La ions)} \times \text{(abundance ratio of La ions)}$$
$$= 2 \times 4/5 + 3 \times 1/5$$
$$= 2.2$$

$$X_B = \text{(valence of Ta ions)} \times \text{(abundance ratio of Ta ions)} + \quad \text{Formula 2}$$
$$\text{(valence of Ti ions)} \times \text{(abundance ratio of Ti ions)}$$
$$= 5 \times 4/5 + 4 \times 1/5$$
$$= 4.8$$

In the present application, the sum of the average valences is calculated as if $\alpha$=0 is satisfied, even if $\alpha \neq 0$ is satisfied. For example, in the above-mentioned case, the sum of the average valences is 2.2+4.8=7.0 even if $\alpha$=0.02 is satisfied.

In the amorphous dielectric including the compound that is represented by $A_{1+\alpha}BO_xN_y$ and has a composition satisfying the above-mentioned ranges, divalent O anions and trivalent $O_{1.5}$ anions and/or trivalent N anions are arranged in ordered arrays. Thus, ordered domains having anisotropy are formed, and ferroelectricity is exhibited. Note that $O_{1.5}$ is actually present as $O_2$. An octahedron having O and/or N surrounding "B" as vertices, and another octahedron having O and/or N surrounding another "B" as vertices share excessive O.

Divalent O anions and trivalent $O_{15}$ anions and/or trivalent N anions can be arranged in ordered arrays because $6.70 \leq 2x+3y \leq 7.30$ is satisfied and the sum of the average valence of the A-site ions and the average valence of the B-site ions is 6.70 to 7.30. If the value of 2x+3y and the sum of the average valence of the A-site ions and the average valence of the B-site ions are roughly 6, the ordered domains having anisotropy are not formed, and ferroelectricity is not exhibited through the order-disorder mechanism.

The compound that is represented by $A_{1+\alpha}BO_xN_y$ and has the above-mentioned composition may be a displacive ferroelectric as well as an order-disorder ferroelectric at the same time. This is because, in an octahedron having O and/or N surrounding "B" as vertices, "B" may slightly be displaced. It is estimated that this displacement produces a relative permittivity of about 300 using first-principles calculation. In contrast, Example 1 (described later) has a relative permittivity of over 1000. Consequently, it is assumed that ferroelectricity is exhibited mainly through the order-disorder mechanism in the amorphous dielectric including the compound that is represented by $A_{1+\alpha}BO_xN_y$ and has the composition satisfying the above-mentioned ranges.

Constituent elements of "A" and "B" are not limited. "A" may be one or more elements selected from Sr, Ba, Ca, La, Ce, Pr, Nd, and Na. "B" may be one or more elements selected from Ta, Nb, Ti, and W.

Figure 2:
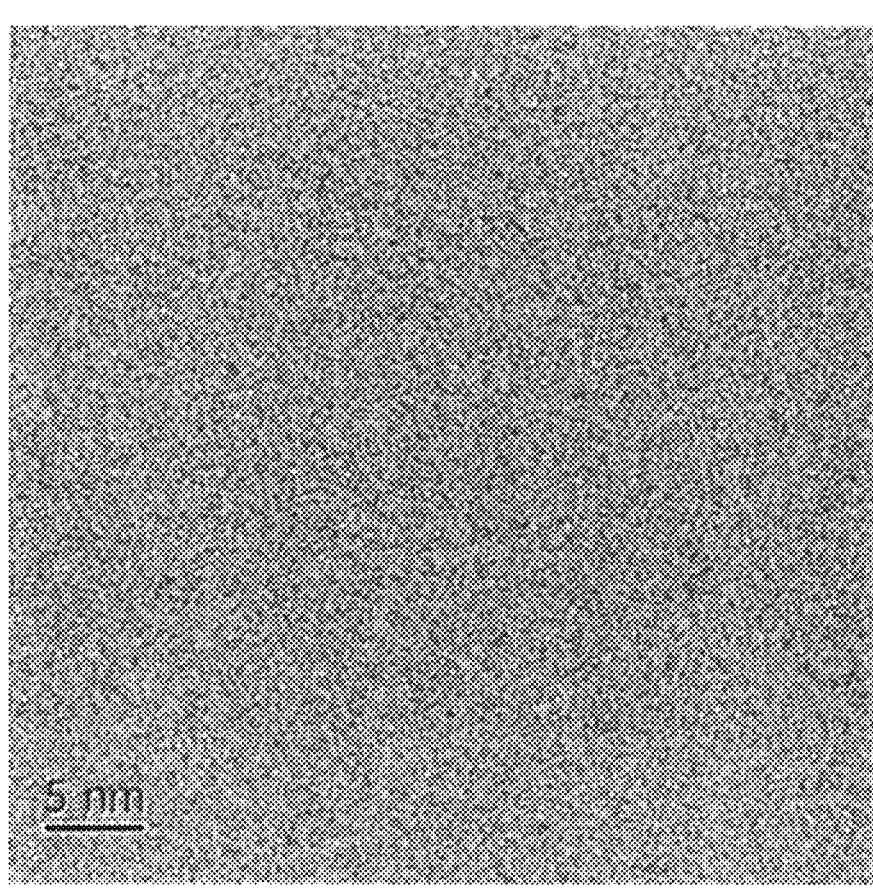
FIG. 2 is a transmission electron microscope (TEM) image of a dielectric.

The amorphous dielectric including the order-disorder ferroelectric has short ordered domains, unlike a dielectric including an order-disorder ferroelectric having a high crystallinity. For example, the amorphous dielectric may have ordered domains with a length of 10 nm or less and may have ordered domains with a length of 2 nm or less. The shorter the ordered domains, the easier it is to prevent reduction of the electrical resistance due to thinning of the amorphous dielectric. To determine the length of the ordered domains of the amorphous dielectric, an image (TEM image) captured by observing the amorphous dielectric with a TEM can be used. FIG. 2 is an example of a TEM image of the dielectric according to the present embodiment. White dots represent the A-site ions or B-site ions. In this TEM image, white dots are scattered evenly. The TEM image indicates that the dielectric includes the ordered domains with a length of 2 nm or less. Note that the magnification and the size of the TEM image are not limited as long as the length of the ordered domains can be checked.

The size of the crystallites in the amorphous dielectric and the length of the ordered domains of the amorphous dielectric correspond. The compound, which is represented by $A_{1+\alpha}BO_xN_y$ and has the composition satisfying the above-mentioned ranges, has a small size limit of the crystallites capable of exhibiting ferroelectricity. The size limit is less than 1 nm. Thus, the amorphous dielectric including the compound has a high relative permittivity when having the above-mentioned short ordered domains.

Because the amorphous dielectric according to the present embodiment has the specific structure, distinctive results are produced when an XRD analysis using CuKα as the primary source of radiation and Raman spectroscopy are performed. Specifically, when the XRD analysis using CuKα as the primary source of radiation is performed, the number of broad peaks detected in the diffraction angle 2θ range of $10° \leq 2\theta \leq 60°$ is one or more and two or less. Further, the number of peaks detected in the Raman shift range of 500 $cm^{-1}$ or more and 1000 $cm^{-1}$ or less is one or more and three or less.

With the XRD, a compound having a high crystallinity can be evaluated. With Raman spectroscopy, a compound having a fixed interatomic bond length can be evaluated even if the compound does not have a high crystallinity. With both the XRD and Raman spectroscopy, it possible to suitably evaluate the amorphous dielectric according to the present embodiment.

Figure 3:
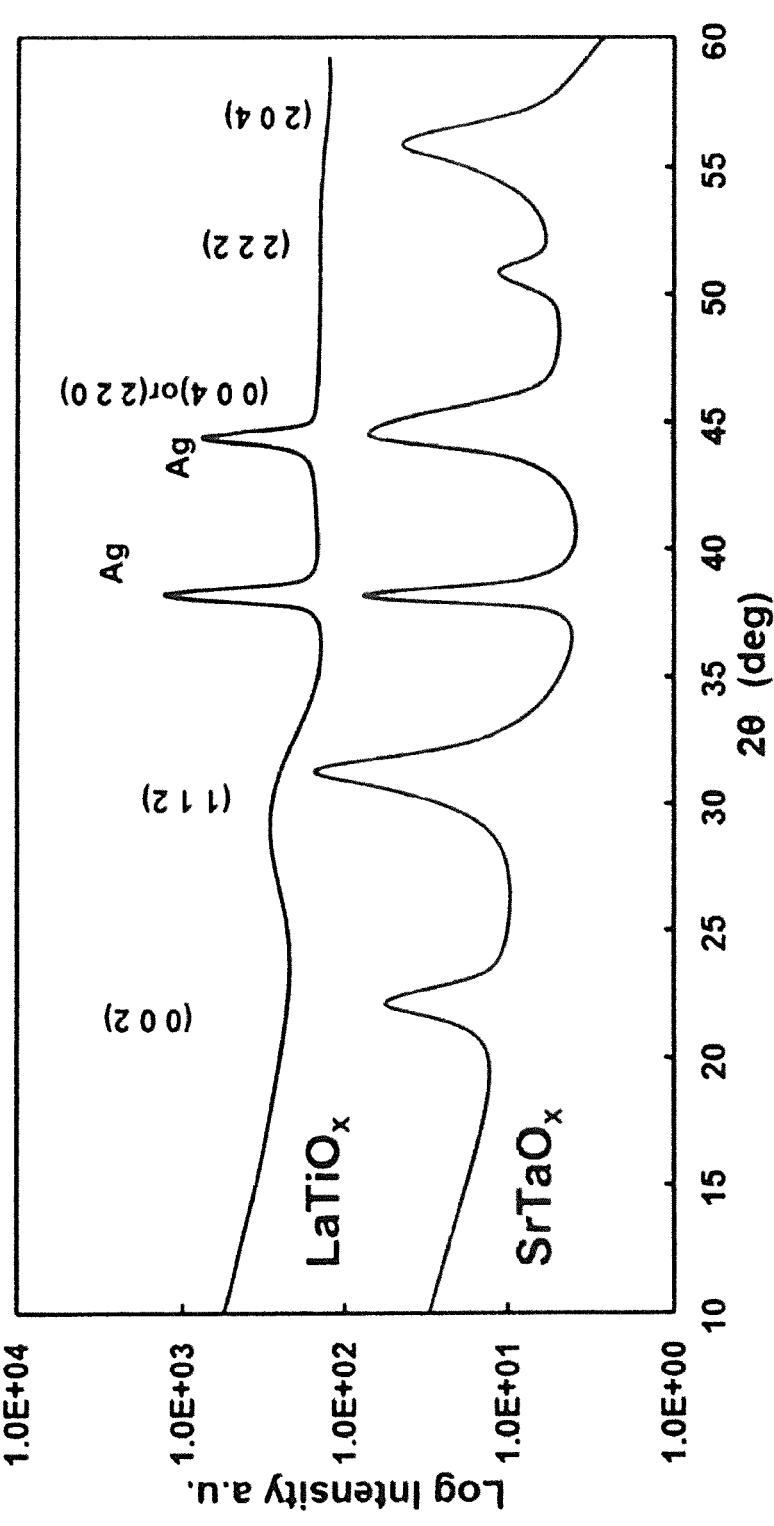
FIG. 3 is a chart obtained using an X-ray diffraction (XRD) method.

FIG. 3 is a chart obtained by performing the XRD analysis of the amorphous dielectric including $LaTiO_x$ with a low crystallinity (an example of the amorphous dielectric according to the present embodiment) and a dielectric including $SrTaO_x$ with a high crystallinity. The amorphous dielectric including $LaTiO_x$ had a capacitance of 49.1 $nF/mm^2$, a thickness of 191 nm, and a relative permittivity of 1059 at a measurement frequency of 1 kHz. The dielectric including $SrTaO_x$ had a capacitance of 19.2 $nF/mm^2$, a thickness of 447 nm, and a relative permittivity of 1035 at a measurement frequency of 1 kHz.

The vertical axis shows intensity using a logarithmic scale, and the horizontal axis shows the diffraction angle 2θ using a normal scale. Also, regarding the dielectric including $SrTaO_x$ with a high crystallinity, a diffraction plane to which each peak is attributable is indicated. The peaks indicated as "Ag" are attributable to a Ag film vapor-deposited on the dielectric thin film for the XRD measurement. Peaks not attributable to the dielectric are not taken into account.

In the XRD pattern of the dielectric including $SrTaO_x$ with a high crystallinity, at least four sharp peaks are detected. This indicates that this dielectric includes long ordered domains, because this dielectric has a high crystallinity and includes many large crystals. In contrast, in the XRD pattern of the amorphous dielectric including $LaTiO_x$ with a low crystallinity (an example of the amorphous dielectric according to the present embodiment), only one broad peak is detected in the range of roughly $25° \leq 2\theta \leq 35°$. This indicates that this amorphous dielectric does not include long ordered domains, because this dielectric has a low crystallinity and does not include large crystals. Note that, detection of no peaks in the XRD pattern of the dielectric indicates that the dielectric does not include any crystallites.

To supplement the XRD data, the extended X-ray absorption fine structure (EXAFS) may be analyzed. With the XRD, orderliness of cations (e.g., La ions and Ti ions) can be evaluated. However, orderliness of anions of light elements with an atomic number of 18 or less (e.g., O ions and N ions) cannot be evaluated with the XRD. In contrast, by analyzing the EXAFS, orderliness of anions of light elements can be evaluated.

It is assumed that, in normal dielectrics, orderliness of cations mainly contributes to the dielectric properties of the dielectrics. Thus, normally, dielectrics with a high crystallinity have high dielectric properties, and dielectrics with a low crystallinity (e.g., amorphous dielectrics) have low dielectric properties.

The present inventors have found that, in the dielectric mainly including an oxynitride or including an oxide having a crystal structure similar to that of oxynitrides, orderliness of anions contributes to the dielectric properties of the dielectric more than orderliness of cations does.

With Raman spectroscopy, it is possible to evaluate whether molecular vibration between anions has specific vibration behavior. In the case of the dielectric including the compound represented by $A_{1+\alpha}BO_xN_y$, it is possible to evaluate whether molecular vibration between O ions, molecular vibration between N ions, and/or molecular vibration between O ions and N ions have the specific vibration behavior. That is, Raman spectroscopy can be used to evaluate orderliness of anions surrounding cations (e.g., the B-site ions) in the compound represented by $A_{1+\alpha}BO_xN_y$. As described later, designing a dielectric material having a specific Raman spectrum can give a dielectric material with high dielectric properties.

Figure 4:
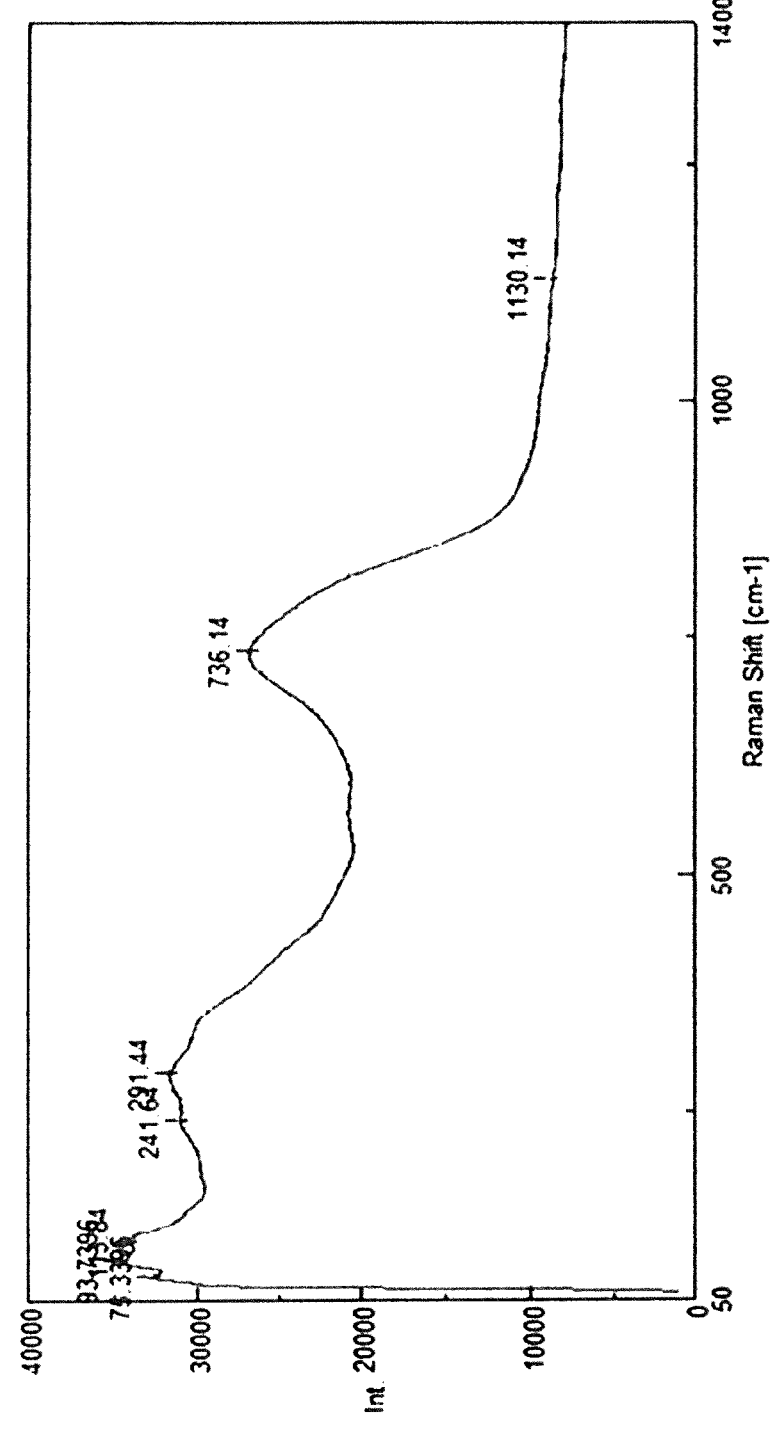
FIG. 4 is a chart obtained using Raman spectroscopy.

FIG. 4 is a chart obtained using Raman spectroscopy of the above-mentioned amorphous dielectric including $LaTiO_x$. The vertical axis shows intensity, and the horizontal axis shows the Raman shifts. Peaks are automatically detected, and the Raman shifts corresponding to the locations of the peaks are shown in numerals.

In the Raman shift range of 50 $cm^{-1}$ or more and less than 500 $cm^{-1}$, a number of peaks are automatically detected, and some numerals of the Raman shifts corresponding to the locations of the peaks are difficult to read. Data in the range of 50 $cm^{-1}$ or more and less than 500 $cm^{-1}$ is mainly related to molecular vibration between cations and anions.

In contrast, data in the range of 500 $cm^{-1}$ or more and 1000 $cm^{-1}$ or less is mainly related to molecular vibration between anions. In the range of 500 $cm^{-1}$ or more and 1000 $cm^{-1}$ or less, one peak at 736.14 $cm^{-1}$ is automatically detected. Also, in the range of 750 $cm^{-1}$ to 800 $cm^{-1}$, there is a shoulder peak that is not detected automatically. This shoulder peak is also deemed to be a peak detected in the Raman shift range of 500 $cm^{-1}$ or more and 1000 $cm^{-1}$ or less. Thus, in the chart obtained using Raman spectroscopy of the amorphous dielectric including $LaTiO_x$ with a low crystallinity (an example of the amorphous dielectric according to the present embodiment), two peaks are detected in the range of 500 $cm^{-1}$ or more and 1000 $cm^{-1}$ or less.

Detection of one or more and three or less peaks in the range of 500 $cm^{-1}$ or more and 1000 $cm^{-1}$ or less indicates that the measured dielectric includes short ordered domains and is not disordered completely. This means that the measured dielectric is an amorphous dielectric having short ordered domains.

If four or more peaks are detected in the range of 500 $cm^{-1}$ or more and 1000 $cm^{-1}$ or less in Raman spectroscopy of the dielectric, the dielectric includes a number of large crystals with a cubic crystal structure. In this case, the dielectric readily has a lower relative permittivity than when the dielectric is the amorphous dielectric. If no peaks are detected in the range of 500 $cm^{-1}$ or more and 1000 $cm^{-1}$ or less in Raman spectroscopy of the dielectric, the dielectric is a disordered dielectric, which is not an amorphous dielectric.

Figure 5:
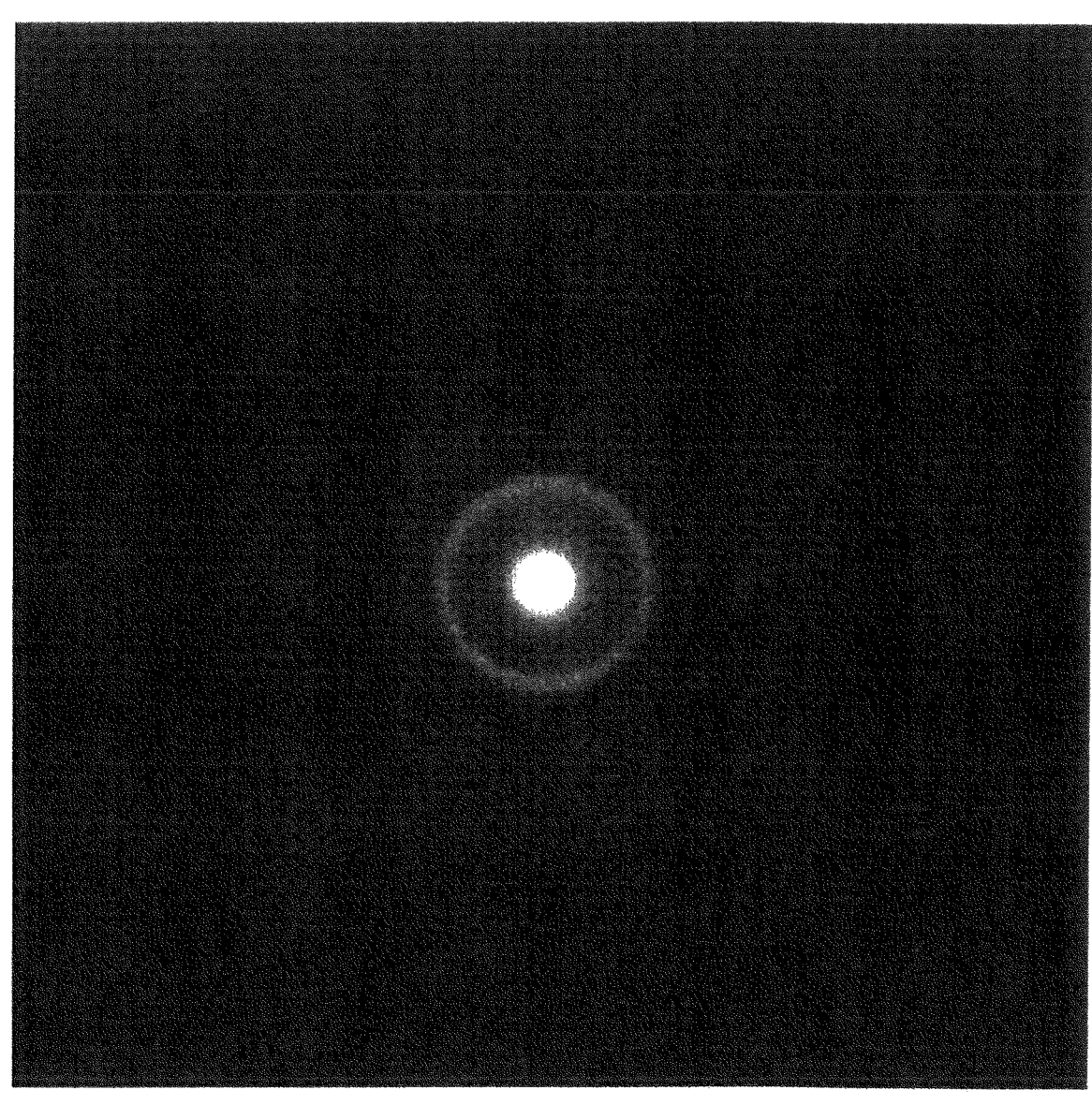
FIG. 5 is an X-ray diffraction image of a dielectric taken with a TEM.

From the fact that an X-ray diffraction image of the dielectric according to the present embodiment captured with a TEM has a hollow X-ray diffraction pattern, it is confirmed that the dielectric is the amorphous dielectric having a low crystallinity and not having long ordered domains. FIG. 5 is an X-ray diffraction image of the amorphous dielectric including LaTiO$_x$ with a low crystallinity (an example of the amorphous dielectric according to the present embodiment) (Example 1 described later) captured with a TEM. FIG. 5 shows a very light circle at a center, and a light annulus surrounding the circle. This annulus is the hollow X-ray diffraction pattern.

Method of Manufacturing the Thin Film Capacitor 1

Next, a method of manufacturing the thin film capacitor 1 is explained. Hereinafter, a method of manufacturing the thin film capacitor 1 having the dielectric thin film 13 including the amorphous dielectric constituted by LaTiO$_x$N$_y$ is explained. The same applies when the dielectric thin film 13 has a different composition.

A method of forming a thin film to be the dielectric thin film 13 in the end is not limited. For example, a vacuum deposition method, sputtering, a metal organic chemical vapor deposition (MO-CVD) method, a metal organic decomposition (MOD) method, a sol-gel method, and a chemical solution deposition (CSD) method may be mentioned. The raw material used to form the film may include trace amounts of impurities and subcomponents. This is not a problem as long as the impurities and subcomponents do not significantly impair the performance of the thin film. The dielectric thin film 13 according to the present embodiment may also include trace amounts of impurities and subcomponents as long as they do not significantly impair the performance.

When sputtering or the like is used for film formation among the above-mentioned film forming methods, the dielectric given in the end readily becomes the amorphous dielectric according to the present embodiment. In the present embodiment, the film forming method by sputtering is explained.

First, the substrate 11 is prepared. The material of the substrate 11 is not limited. For example, using a Si single crystal substrate is advantageous in terms of availability and costs. In terms of flexibility, metal foil (e.g., Ni foil) can be used as the substrate. When the metal foil is used as the substrate 11, the substrate 11 may double as the lower electrode 12.

When the substrate 11 does not double as the lower electrode 12, the lower electrode 12 is formed on the substrate 11 next. The material of the lower electrode 12 is not limited as long as it functions as the electrode. For example, Pt, Ag, and Ni may be mentioned. The thickness of the lower electrode is not limited. When the lower electrode 12 is formed on the substrate 11, the thickness of the lower electrode 12 may be 0.01 to 10 μm. A method of forming the lower electrode 12 is not limited. For example, sputtering and a vapor deposition method may be mentioned.

The dielectric thin film 13 is formed on the lower electrode 12 next. A method of forming the dielectric thin film 13 by sputtering is explained below.

First, a target is prepared. A method of preparing the target is not limited. A known method can be used. The target may be any type. An alloy, a nitride sintered body, a metal oxynitride sintered body or so can be used, other than a metal oxide sintered body including La and Ti, which are constituent elements of the dielectric thin film 13 to be produced. In the target, each element is preferably distributed evenly. The distribution may be uneven as long as the quality of the dielectric thin film 13 to be produced is not affected. Further, the target does not necessarily have to be one, and a plurality of targets including part of the constituent elements of the dielectric thin film 13 may be prepared and can be used for forming the film. The target may have any shape as long as it is suitable for a film formation device used.

The target and the substrate 11 with the lower electrode 12 are placed in a chamber next. Then, power is input to the target while an Ar gas is supplied into the chamber. An O$_2$ gas and/or a N$_2$ gas may be supplied into the chamber with the Ar gas at the same time as necessary. The substrate 11 may be heated as necessary. This can form the dielectric thin film 13 on the lower electrode 12. When the dielectric thin film 13 includes nitrogen, formation of the dielectric thin film 13 and nitriding of the dielectric thin film 13 can be performed simultaneously. The temperature of the substrate 11 is not limited. The temperature of the substrate 11 depends on the constituent elements, compositions, or the like of the dielectric thin film 13 and the substrate 11. However, when the substrate 11 has a temperature lower than a conventional temperature, specifically when the substrate 11 has a temperature ranging from room temperature to 500° C. during film formation, the dielectric thin film 13 including the amorphous dielectric according to the present embodiment is readily produced. The power input to the target is not limited. For example, the power may be 100 to 300 W. Sputtering time is as long as the time necessary for the dielectric thin film 13 to have an intended thickness. Annealing may be performed after the film is formed.

The Ar gas is a gas normally used for forming dielectric thin films. The dielectric thin film 13 is difficult to be formed without supply of the Ar gas. The amount of the Ar gas is not limited.

The O$_2$ gas and the N$_2$ gas, which are reactant gases, may be supplied together with the Ar gas simultaneously. When the N$_2$ gas is not supplied, the dielectric thin film 13 including the amorphous dielectric constituted by LaTiO$_x$ is produced. When the N$_2$ gas is supplied, the dielectric thin film 13 including the amorphous dielectric constituted by LaTiO$_x$N$_y$ (y>0) is produced.

The amounts of the O$_2$ gas and the N$_2$ gas are not limited and are, for example, 0 to 5 sccm each.

Lastly, forming the upper electrode 14 on the dielectric thin film 13 can complete manufacture of the thin film capacitor 1. Note that, the material of the upper electrode 14 is not limited, and Ag, Au, and Cu or so can be used. A method of forming the upper electrode 14 is also not limited. For example, the upper electrode 14 can be formed by sputtering.

Hereinabove, the embodiment of the present invention is explained, but the present invention is not to be limited to the embodiment in any way, and the present invention can be carried out in various different embodiments within the scope of the present invention.

Capacitor elements according to the present invention mean elements using dielectric properties, and include capacitors, filters, memories, or the like. The dielectric thin film including the amorphous dielectric according to the present embodiment is suitably used for a capacitor element that is demanded to have a high relative permittivity with a thinned dielectric thin film. The capacitor elements according to the present invention also include substrate-embedded capacitor elements.

Electronic devices according to the present invention include capacitor chips, multilayer capacitors, thin film capacitors, substrate-embedded capacitors, capacitors directly formed on substrates, or the like. The dielectric thin film including the amorphous dielectric according to the present embodiment is suitably used for an electronic device that is demanded to have a high relative permittivity with a thinned dielectric thin film.

EXAMPLES

Hereinafter, the present invention is explained based on further detailed examples, but the present invention is not to be limited thereto.

Experiment 1

Example 1

A film formation target was selected as appropriate so that a dielectric thin film of Example 1 had a composition of $LaTiO_x$ ($6.70 \leq 2x \leq 7.30$) in the end.

A TEM image of the dielectric thin film was captured with a TEM at a magnification of 2,000,000. Then, the length of ordered domains was calculated using the TEM image. Table 1 shows the results.

An X-ray diffraction image of the dielectric thin film was taken with a TEM. It was confirmed that the X-ray diffraction image of Example 1 had a hollow X-ray diffraction pattern.

The crystal structure of the crystallites in the dielectric thin film was checked with XRD. When a pattern was not able to be checked with XRD due to the dielectric being an amorphous dielectric, the dielectric was heated at 700 to 800° C. in an atmosphere without $O_2$ (e.g., a vacuum or an inert atmosphere) using infrared thermal annealing to accelerate crystallization of the dielectric. The dielectric which then had more crystallites, was checked with XRD for the crystal structure of the crystallites. Table 1 shows the results.

From the above measurement, whether the dielectric thin film of Example 1 was an amorphous dielectric or not was checked. Table 1 shows the results.

The relative permittivity was measured at room temperature, a measurement frequency of 1 kHz, a voltage of 0.1 Vrms, with an LCR meter (E4980A manufactured by Agilent Technologies Japan, Ltd.). Table 1 shows the results. A relative permittivity of 800 or more was deemed good, and a relative permittivity of 1000 or more was deemed better.

TABLE 1

| | Composition | Form | Sum of average valences | Crystal structure of crystallites (crystals) | Ordered domain length | Number of XRD peaks | Number of Raman peaks | Amorphous dielectric | Film thickness [nm] | Relative permittivity |
|---|---|---|---|---|---|---|---|---|---|---|
| Example 1 | $LaTiO_x$ | Thin film | 7.00 | Perovskite | Less than 2 nm | 1 | 2 | Yes | 200 | 1050 |
| Comparative Example 1 | $SrTaO_x$ | Thin film | 7.00 | Perovskite | Over 10 nm | 4 | 4 | No | 200 | 50 |
| Reference Example 1 | $SrTaO_xN_y$ | Thin film | 7.00 | Perovskite | Over 10 nm | 4 | 2 | No | 1000 | 1500 |
| Comparative Example 2 | $SrTaO_x$ | Thin film | 7.00 | Perovskite slab | Over 10 nm | 2 | 5 | No | 400 | 50 |
| Comparative Example 3 | $LaTiO_x$ | Thin film | 7.00 | Perovskite | Over 10 nm | 4 | 2 | No | 200 | 50 |
| Comparative Example 4 | $BaTiO_3$ | Thin film | 6.00 | Perovskite | None | 1 | 3 | No | 200 | 300 |

Next, the film formation target was placed in a film forming device, then a Si substrate was placed so as to face the film formation target. The Si substrate had a Pt film as a lower electrode on a surface of the substrate.

Then, the dielectric thin film was formed by sputtering to have a thickness shown in Table 1. The time for forming the film was 0.5 to 2 hours. The substrate temperature during film formation was 500° C.

An XRD analysis of the dielectric thin film was performed using CuKα as the primary source of radiation. SmartLab, an automated multipurpose horizontal X-ray diffractometer manufactured by Rigaku Corporation, was used as a measurement device. Table 1 shows the number of peaks detected in the diffraction angle 2θ range of $10° \leq 2\theta \leq 60°$. Note that, in Example 1 and Examples 2 to 5 (described later), it was confirmed that peaks were broad.

Raman spectroscopy of the dielectric thin film was performed. NRS-7100 manufactured by JASCO Corporation was used as a measurement device. Table 1 shows the number of peaks detected in the Raman shift range of 500 $cm^{-1}$ or more and 1000 $cm^{-1}$ or less.

According to Table 1, Example 1 was an amorphous dielectric including a compound represented by $LaTiO_x$. Example 1 had a good relative permittivity even though the film thickness was as thin as 200 nm.

Manufacturing conditions and results of Reference Example 1 and Comparative Examples 1 to 4, which are mentioned in Table 1 along with Example 1, are shown below.

Comparative Example 1

In Comparative Example 1, the composition of the dielectric thin film was changed from that of Example 1, and the substrate temperature during film formation was changed to 700° C. Table 1 shows the results.

Comparative Example 1 was a polycrystalline dielectric including a compound represented by $SrTaO_x$ ($6.70 \leq 2x \leq 7.30$). The dominant crystal structure of the crystals in the dielectric was a cubic perovskite structure. Thus, Comparative Example 1 had a remarkably low relative permittivity at a film thickness of 200 nm. Note that, in Comparative Example 1, the number of peaks detected in the Raman shift range of 500 cm$^{-1}$ or more and 1000 cm$^{-1}$ or less was larger than that of Example 1, but the intensity of each peak was lower than that of Example 1.

Reference Example 1

In Reference Example 1, a N$_2$ gas was supplied during film formation to introduce N into the dielectric thin film, unlike Comparative Example 1. The film thickness was 1000 nm. Power applied to the film formation target to excite sputtering plasma was changed from that of Comparative Example 1, so that the crystals would be tetragonal. Table 1 shows the results.

Reference Example 1 was a polycrystalline dielectric including a compound represented by SrTaO$_x$N$_y$ ($6.70 \leq 2x + 3y \leq 7.30$). The dominant crystal structure of the crystals in the dielectric was a tetragonal perovskite structure. Thus, Reference Example 1 had a sufficiently high relative permittivity at a film thickness of 1000 nm.

At a film thickness of about 1000 nm, dielectrics readily have a high relative permittivity when the tetragonal perovskite structure is the dominant crystal structure of the crystals in the dielectrics. In contrast, dielectrics readily have a low relative permittivity when the cubic perovskite structure is the dominant crystal structure, in which case the relative permittivity is likely to be lower than that of amorphous dielectrics.

However, provided that the film thickness is about as thin as that of Example 1, it is assumed that the relative permittivity decreases even when the tetragonal perovskite structure is dominant. It is also assumed that the relative permittivity is the highest when dielectrics are amorphous.

Comparative Example 2

In Comparative Example 2, the film was formed by a PLD method instead of by sputtering so that crystals had a perovskite slab structure, unlike Comparative Example 1. Further, the film was formed without introduction of oxygen. The PLD method was used because the PLD method had a higher transferability of the composition of the film formation target and a higher transferability of the structure of the film formation target than sputtering. The film thickness was 400 nm. Table 1 shows the results.

Comparative Example 2 had a smaller number of XRD peaks than Comparative Example 1 and Reference Example 1. This was because of the perovskite slab structure of the crystals in the dielectric. Comparative Example 2 was a polycrystalline dielectric and did not have a good relative permittivity at a film thickness of 400 nm.

Comparative Example 3

The dielectric thin film of Comparative Example 3 was produced and subjected to measurement as in Example 1, except that the substrate temperature during film formation was changed to 700° C. and that the power applied to the film formation target was tripled. Table 1 shows the results.

Comparative Example 3 was a polycrystalline dielectric including a compound represented by LaTiO$_x$ ($6.70 \leq 2x \leq 7.30$). The dominant crystal structure of the crystals in the dielectric was the tetragonal perovskite structure. Thus, Comparative Example 3 had a remarkably low relative permittivity at a film thickness of 200 nm.

Comparative Example 4

In Comparative Example 4, the composition of the dielectric thin film was changed from that of Example 1, and the substrate temperature during film formation was changed to 200 to 300° C. Table 1 shows the results.

In Comparative Example 4, no ordered domains were formed. Comparative Example 4 was a polycrystalline dielectric including a compound represented by BaTiO$_3$. The crystals had a size of about 10 to 100 nm. Because the size limit of the crystals of BaTiO$_3$ is large, Comparative Example 4 did not have a sufficiently high relative permittivity at the above-mentioned crystal size.

Experiment 2

Example 2

The dielectric thin film of Example 2 was produced and subjected to measurement as in Example 1, except that the film formation target was selected as appropriate so that the dielectric thin film had a composition of La$_{1.2}$TiO$_x$ ($6.70 \leq 2x \leq 7.30$) in the end. Table 2 shows the results. Note that, in Example 2, $\alpha$=0.2 was satisfied. Further, in all other Examples, $\alpha$=0 was satisfied.

An XRD analysis of the dielectric thin film was performed using CuK$\alpha$ as the primary source of radiation. SmartLab, an automated multipurpose horizontal X-ray diffractometer manufactured by Rigaku Corporation, was used as a measurement device. Table 2 shows the number of peaks detected in the diffraction angle $2\theta$ range of $10° \leq 2\theta \leq 60°$.

Raman spectroscopy of the dielectric thin film was performed. NRS-7100 manufactured by JASCO Corporation was used as a measurement device. Table 2 shows the number of peaks detected in the Raman shift range of 500 cm$^{-1}$ or more and 1000 cm$^{-1}$ or less.

A TEM image of the dielectric thin film was captured with a TEM at a magnification of 2,000,000. Then, the length of the ordered domains was calculated using the TEM image. Table 2 shows the results.

An X-ray diffraction image of the dielectric thin film was taken with a TEM. It was confirmed that the X-ray diffraction images of Examples 2 and Examples 3 to 5 (described later) had a hollow X-ray diffraction pattern.

The crystal structure of the crystallites in the dielectric thin film was checked with XRD. When a pattern was not able to be checked with XRD due to the dielectric being an amorphous dielectric, the dielectric was heated at 700 to 800° C. in an atmosphere without O$_2$ (e.g., a vacuum or an inert atmosphere) using infrared thermal annealing to accelerate crystallization of the dielectric. The dielectric which then had more crystallites, was checked with XRD for the crystal structure of the crystallites. Table 2 shows the results.

From the above measurement, whether the dielectric thin film of Example 2 was an amorphous dielectric or not was checked. Table 2 shows the results.

The relative permittivity was measured at room temperature, a measurement frequency of 1 kHz, a voltage of 0.1 Vrms, with an LCR meter (E4980A manufactured by Agilent Technologies Japan, Ltd.). Table 2 shows the results. A relative permittivity of 800 or more was deemed good, and a relative permittivity of 1000 or more was deemed better.

TABLE 2

| | Composition | Form | Sum of average valences | Crystal structure of crystallites (crystals) | Ordered domain length | Number of XRD peaks | Number of Raman peaks | Amorphous dielectric | Film thickness [nm] | Relative permittivity |
|---|---|---|---|---|---|---|---|---|---|---|
| Example 1 | $LaTiO_x$ | Thin film | 7.00 | Perovskite | Less than 2 nm | 1 | 2 | Yes | 200 | 1050 |
| Example 2 | $La_{1.2}TiO_xN_y$ | Thin film | 7.00 | Perovskite | Less than 10 nm | 1 | 2 | Yes | 200 | 1000 |
| Example 3 | $(La_{0.8}Sr_{0.2})(Ti_{0.8}Ta_{0.2})O_xN_y$ | Thin film | 7.00 | Perovskite | Less than 10 nm | 1 | 2 | Yes | 200 | 1200 |
| Example 4 | $(La_{0.91}Nd_{0.09})TiO_x$ | Thin film | 7.00 | Perovskite | Less than 10 nm | 1 | 2 | Yes | 200 | 1100 |
| Example 5 | $SrTaO_xN_y$ | Thin film | 7.00 | Perovskite | Less than 10 nm | 1 | 2 | Yes | 200 | 800 |
| Comparative Example 6 | $LaTiO_2N$ | Powder | 7.00 | Perovskite | 1 μm | 6 | 4 | No | N/A | Unmeasured |

According to Table 2, Example 2 was an amorphous dielectric including the compound shown in Table 2. Example 2 had a good relative permittivity even though the film thickness was as thin as 200 nm.

Manufacturing conditions of Examples 3 to 5, which are mentioned in Table 2 along with Examples 1 and 2, are shown below. Each of Examples 3 to 5 was an amorphous dielectric including the compound shown in Table 2. Each had a good relative permittivity even though the film thickness was as thin as 200 nm.

Example 3

The dielectric thin film of Example 3 was produced and subjected to measurement as in Example 1, except that the film formation target was selected as appropriate so that the dielectric thin film had a composition of $(La_{0.8}Sr_{0.2})$ $(Ti_{0.8}Ta_{0.2})O_xN_y$ $(6.70 \leq 2x+3y \leq 7.30)$ in the end. Table 2 shows the results.

Example 4

The dielectric thin film of Example 4 was produced and subjected to measurement as in Example 1, except that the film formation target was selected as appropriate so that the dielectric thin film had a composition of $(La_{0.91}Nd_{0.09})TiO_x$ $(6.70 \leq 2x \leq 7.30)$ in the end. Table 2 shows the results.

Example 5

The dielectric thin film of Example 5 was produced and subjected to measurement as in Example 1, except that the film formation target was selected as appropriate so that the dielectric thin film had a composition of $SrTaO_xN_y$ $(6.70 \leq 2x+3y \leq 7.30)$ in the end. Table 2 shows the results.

Comparative Example 6

In Comparative Example 6, a dielectric powder was prepared unlike other Examples and Comparative Examples. The method used to prepare the dielectric powder is explained below.

$La_2O_3$ and $TiO_2$ in a powdery form were prepared and weighed so as to meet an atomic ratio of La:Ti=1:1. Next, the weighed $La_2O_3$ and $TiO_2$ powders were mixed with a ball mill to give a slurry.

The slurry was dried at 120° C. for 10 hours. The dried slurry was calcined at 1000° C. for 2 hours to give a powdery $La_2Ti_2O_7$ precursor.

The precursor was subjected to nitriding treatment under a flow of $NH_3$ at 100 mL/min to give the dielectric powder, which was $LaTiO_2N$. The nitriding treatment was performed at 1000° C. for 12 hours.

An XRD analysis of the dielectric powder was performed using $CuK\alpha$ as the primary source of radiation. SmartLab, an automated multipurpose horizontal X-ray diffractometer manufactured by Rigaku Corporation, was used as a measurement device. As shown in Table 2, the number of peaks detected in the diffraction angle $2\theta$ range of $10° \leq 2\theta \leq 60°$ was six. It was thus confirmed that the dielectric powder was crystallized.

Raman spectroscopy of the dielectric powder was performed. NRS-7100 manufactured by JASCO Corporation was used as a measurement device. Table 2 shows the number of peaks detected in the Raman shift range of 500 $cm^{-1}$ or more and 1000 $cm^{-1}$ or less.

A TEM image of the dielectric powder was captured with a TEM at a magnification of 2,000,000. Then, the length of the ordered domains was calculated using the TEM image. Table 2 shows the results.

The crystal structure of the crystallites in the dielectric powder was checked with XRD. Table 2 shows the results.

From the above measurement, whether the dielectric powder was an amorphous dielectric or not was checked. Table 2 shows the results.

Figure 6:
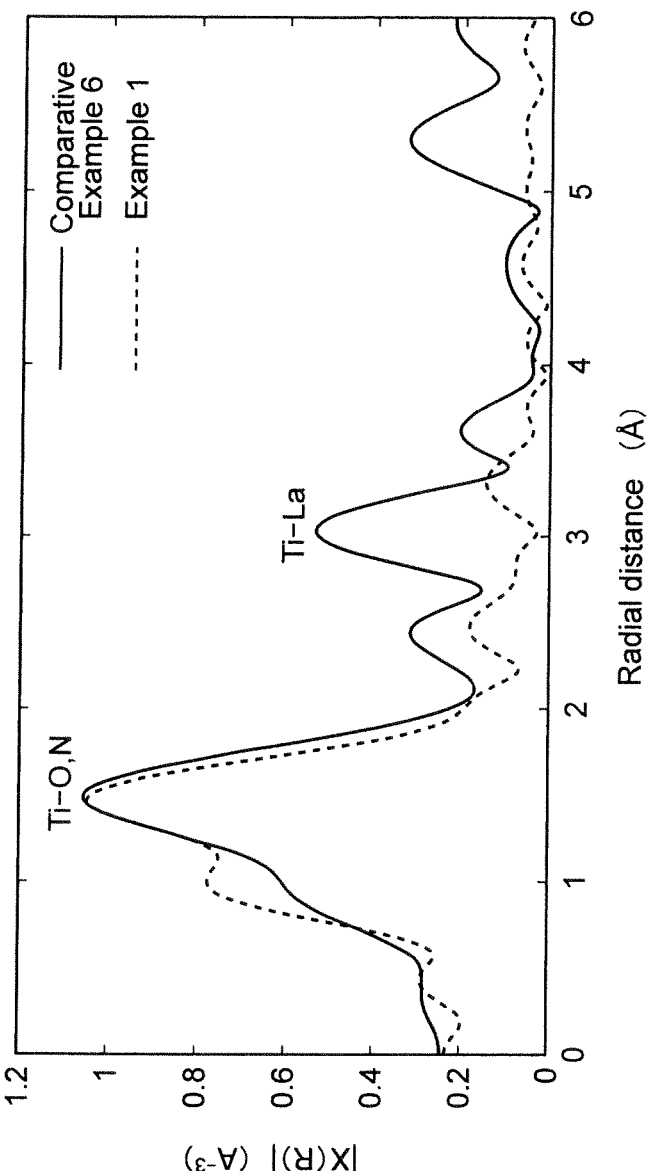
FIG. 6 is a chart showing the results of analyzing EXAFS.

The EXAFS of the dielectric powder was analyzed. The facility used was Aichi Synchrotron Radiation Center. The beamline used was BL5S1. The monochromator used was a Si(111) double-crystal monochromator. FIG. 6 shows the results.

The EXAFS of the dielectric thin film of Example 1 was analyzed using a conversion electron yield method. The facility used was Aichi Synchrotron Radiation Center. The beamline used was BL5S1. The monochromator used was a Si(111) double-crystal monochromator. FIG. 6 shows the results. The horizontal axis of FIG. 6 is a distance from a Ti ion.

In a $LaTiO_2N$ crystal, the distance between a Ti ion (cation) and an O ion or a N ion (anion) is the first proximity distance, and the distance between a Ti ion (cation) and a La ion (cation) is the second proximity distance.

Regarding the dielectric powder of Comparative Example 6, peaks were confirmed at the points corresponding to the first proximity distance and the second proximity distance. It was thus confirmed that positions of La ions (cations), Ti ions (cations), O ions (anions), and N ions (anions) were sufficiently regularized in the dielectric powder of Comparative Example 6, meaning that the dielectric powder of Comparative Example 6 was crystallized.

In contrast, regarding the dielectric thin film of Example 1, no peaks were confirmed at the point corresponding to the second proximity distance while a peak was confirmed at the point corresponding to the first proximity distance. It was thus confirmed that the dielectric thin film of Example 1 was an amorphous dielectric having regularized distances between Ti ions and O ions but not having sufficiently regularized positions of Ti ions and La ions.

NUMERICAL REFERENCES

1 . . . thin film capacitor
11 . . . substrate
12 . . . lower electrode
13 . . . dielectric thin film
14 . . . upper electrode

What is claimed is:

1. An amorphous dielectric thin film comprising a compound represented by $A_{1+\alpha}BO_xN_y$,
   wherein "A" is one or more elements selected from the group consisting of Sr, Ba, Ca, La, Ce, Pr, Nd, and Na,
   "B" is one or more elements selected from the group consisting of Ta, Nb, Ti, and W,
   $-0.3 \le \alpha \le 0.3$, $0 < x \le 3.50$, $0 < y \le 1.00$, and $6.70 \le 2x+3y \le 7.30$ are satisfied,
   a sum of an average valence of A-site ions and an average valence of B-site ions is 6.70 to 7.30,
   the compound includes at least La as "A" and includes at least Ti as "B", and
   the amorphous dielectric thin film has a thickness of 10 nm or more and 400 nm or less.

2. An amorphous dielectric thin film comprising an order-disorder ferroelectric including an ordered domain with a length of 10 nm or less, wherein
   the amorphous dielectric thin film comprises a compound represented by $A_{1+\alpha}BO_xN_y$,
   "A" is one or more elements selected from the group consisting of Sr, Ba, Ca, La, Ce, Pr, Nd, and Na,
   "B" is one or more elements selected from the group consisting of Ta, Nb, Ti, and W,
   $-0.3 \le \alpha \le 0.3$, $0 < x \le 3.50$, $0 < y \le 1.00$, and $6.70 \le 2x+3y \le 7.30$ are satisfied,
   a sum of an average valence of A-site ions and an average valence of B-site ions is 6.70 to and 7.30,
   the compound includes at least La as "A" and includes at least Ti as "B", and
   the amorphous dielectric thin film has a thickness of 10 nm or more and 400 nm or less.

3. An amorphous dielectric thin film comprising an order-disorder ferroelectric including an ordered domain with a length of 2 nm or less, wherein
   the amorphous dielectric thin film comprises a compound represented by $A_{1+\alpha}BO_xN_y$,
   "A" is one or more elements selected from the group consisting of Sr, Ba, Ca, La, Ce, Pr, Nd, and Na,
   "B" is one or more elements selected from the group consisting of Ta, Nb, Ti, and W,
   $-0.3 \le \alpha \le 0.3$, $0 < x \le 3.50$, $0 < y \le 1.00$, and $6.70 \le 2x+3y \le 7.30$ are satisfied,
   a sum of an average valence of A-site ions and an average valence of B-site ions is 6.70 to 7.30,
   the compound includes at least La as "A" and includes at least Ti as "B", and
   the amorphous dielectric thin film has a thickness of 10 nm or more and 400 nm or less.

4. An amorphous dielectric thin film comprising:
   an X-ray diffraction pattern including one or more and two or less broad peaks detected in a diffraction angle $2\theta$ range of $10° \le 2\theta \le 60°$ with CuKα as a primary source of radiation;
   a Raman spectroscopy pattern including one or more and three or less peaks detected in a Raman shift range of $500\ cm^{-1}$ or more and $1000\ cm^{-1}$ or less, wherein
   the amorphous dielectric thin film comprises a compound represented by $A_{1+\alpha}BO_xN_y$,
   "A" is one or more elements selected from the group consisting of Sr, Ba, Ca, La, Ce, Pr, Nd, and Na,
   "B" is one or more elements selected from the group consisting of Ta, Nb, Ti, and W,
   $-0.3 \le \alpha \le 0.3$, $0 < x \le 3.50$, $0 < y \le 1.00$, and $6.70 \le 2x+3y \le 7.30$ are satisfied,
   a sum of an average valence of A-site ions and an average valence of B-site ions is 6.70 to 7.30,
   the compound includes at least La as "A" and includes at least Ti as "B", and
   the amorphous dielectric thin film has a thickness of 10 nm or more and 400 nm or less.

5. An amorphous dielectric thin film comprising:
   a hollow X-ray diffraction pattern in an X-ray diffraction image captured with a transmission electron microscope; and
   a Raman spectroscopy pattern including one or more and three or less peaks detected in a Raman shift range of $500\ cm^{-1}$ or more and $1000\ cm^{-1}$ or less, wherein
   the amorphous dielectric thin film comprises a compound represented by $A_{1+\alpha}BO_xN_y$,
   "A" is one or more elements selected from the group consisting of Sr, Ba, Ca, La, Ce, Pr, Nd, and Na,
   "B" is one or more elements selected from the group consisting of Ta, Nb, Ti, and W,
   $-0.3 \le \alpha \le 0.3$, $0 < x \le 3.50$, $0 < y \le 1.00$, and $6.70 \le 2x+3y \le 7.30$ are satisfied,
   a sum of an average valence of A-site ions and an average valence of B-site ions is 6.70 to 7.30,
   the compound includes at least La as "A" and includes at least Ti as "B", and
   the amorphous dielectric thin film has a thickness of 10 nm or more and 400 nm or less.

6. A capacitor element comprising the amorphous dielectric thin film according to claim 1.

7. A capacitor element comprising the amorphous dielectric thin film according to claim 2.

8. A capacitor element comprising the amorphous dielectric thin film according to claim 3.

9. A capacitor element comprising the amorphous dielectric thin film according to claim 4.

10. A capacitor element comprising the amorphous dielectric thin film according to claim 5.

11. An electronic device comprising the amorphous dielectric thin film according to claim 1.

12. An electronic device comprising the amorphous dielectric thin film according to claim 2.

13. An electronic device comprising the amorphous dielectric thin film according to claim 3.

14. An electronic device comprising the amorphous dielectric thin film according to claim 4.

15. An electronic device comprising the amorphous dielectric thin film according to claim 5.

* * * * *